Figure 1:
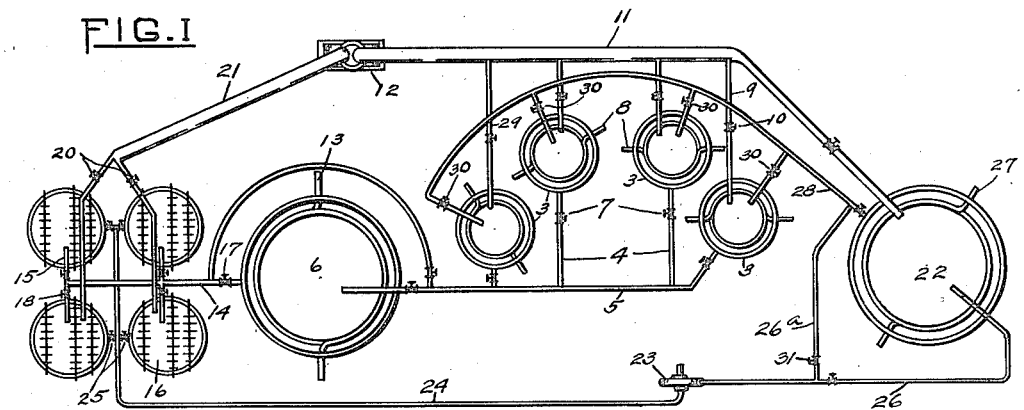

W. H. SOMMER.
METHOD OF RECOVERING SULFATE CRYSTALS.
APPLICATION FILED SEPT. 20, 1915.

1,256,068.

Patented Feb. 12, 1918.

UNITED STATES PATENT OFFICE.

WILLIAM H. SOMMER, OF PEORIA, ILLINOIS, ASSIGNOR, BY MESNE ASSIGNMENTS, TO THE FIRST TRUST AND SAVINGS COMPANY, OF CLEVELAND, OHIO, A CORPORATION OF OHIO, AND WILLIAM E. STONE, OF PEORIA, ILLINOIS, TRUSTEES.

METHOD OF RECOVERING SULFATE CRYSTALS.

1,256,068.

Specification of Letters Patent. Patented Feb. 12, 1918.

Application filed September 20, 1915. Serial No. 51,686.

*To all whom it may concern:*

Be it known that I, WILLIAM H. SOMMER, a citizen of the United States, residing at Peoria, in the county of Peoria and State of Illinois, have invented new and useful Improvements in Methods of Recovering Sulfate Crystals, of which the following is a specification.

This invention has reference to a new and improved method of recovering sulfate of iron from the liquor which results from the pickling of iron or steel wire, rods, etc., in a sulfuric acid bath.

One of the objects of the invention is to recover the sulfate crystals in a more economical and efficient manner than heretofore, preferably, by the use of exhaust steam, which is introduced into the pickling bath in such a manner that the exhaust steam or condensation therefrom will not commingle with the liquor forming the bath, and keeping the liquor forming the bath constantly agitated, or in circulation, by the introduction of air into the solution under slight pressure, which agitation hastens the heating of the solution by continually changing the liquid in contact with the heating elements and assists in removing particles of scale which the solution has loosened on the wire, or rods, etc., thus helping materially the cleaning process.

The invention has for a further object to control the cooling of the solution in the crystallizing tanks by means of air introduced into said solution preferably under a higher pressure than is used in the pickling vats or tanks. The air will agitate the solution and the more it is agitated the smaller the crystals which will be formed; in fact, to obtain a granular product instead of a crystal, it is only necessary to cool the solution quickly, due to the fact that the faster the solution in the crystallizing tanks is cooled the smaller and finer will be the product.

The invention has for a further object to conduct the saturated solution to a settling tank or tanks where the same is maintained at the same temperature as in the pickling vats or tanks, but without agitation, so that the mechanical impurities may be allowed to settle out, then removing said saturated solution to crystallizing tanks where by cooling the sulfate separates and deposits, the cooling of the solution being assisted by the introduction of air thereto under pressure.

In the drawings:—

Figure 2:
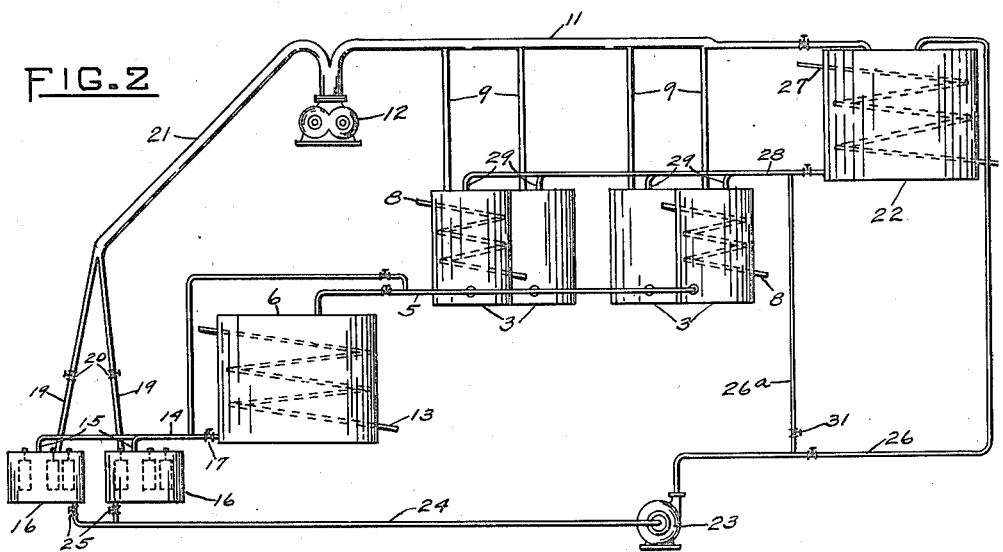

Figure 1 is a plan view showing in a diagrammatic way, one form of apparatus for carrying out my invention, and Fig. 2 is a side elevation thereof.

For the purpose of cleaning wire rods, an acid pickling bath is provided, composed of water and sulfuric acid in proper proportions, in which the rods to be cleaned are submerged, and in order to produce its cleansing action the bath must be heated. The scale on the rods, known as "iron oxid" unites with the sulfuric acid and makes "iron sulfate," and it is this latter product which I am concerned in recovering.

There are two methods of heating the pickling bath, one where the condensation produced by the steam used for heating commingles with the cleaning solution, and the other method by which the steam condensation is prevented from commingling with the cleaning solution. In the former case saturation cannot be reached in the cleaning vats or tanks, and in the latter case saturation can be reached. This process is concerned with heating the pickling bath with exhaust steam passing through coils, thus preventing the steam condensation from commingling with the cleaning solution. To obtain the best results the pickling bath should be kept at a reasonably high temperature, say about 180° Fahr., as the tonnage to be handled is considerable and the wire, rods, etc., are often put into the bath at a very low temperature.

In the practice of my invention, I provide, preferably, a plurality of pickling tanks or vats 3, which may be of any suitable size, and these tanks are adapted to hold a given quantity of water and sulfuric acid, in proper proportions, which is the solution in which the rods are submerged, for cleaning. From each tank extends a discharge pipe 4, and said pipes are connected with a main pipe 5 leading preferably, to a settling tank 6, where the impurities in the bath may be allowed to settle out. During the formation of the iron sulfate in the cleaning tanks or vats 3, there is always a quantity of foreign material accumulating, which, if not given a chance to settle out, contaminates the product in the crystallizing tank and forms a dirty colored product, which cannot be utilized as first grade iron sulfate. It is therefore, not only necessary but essential to the process that this step be taken care of. It is possible to obtain this result, that is, the separation of the impurities, by allowing the sulfate solution to remain at rest in the pickling vats or tanks 3 for a suitable length of time, but I prefer to use the settling tank 6, so as to have the continuous use of the pickling tanks or vats 3 for cleaning purposes. The pipes 4 are controlled by suitable valves 7.

For heating the pickling solution, I employ, preferably, exhaust steam. The exhaust steam is conveyed to and through the solution in the pickling tanks 3, by means of pipes 8, which lead from a suitable supply of exhaust steam and the same suitably coiled within the tanks. Each pipe 8 enters its tank, at or near the top of the tank, and leaves the same at a suitable point, at or near the bottom thereof. Although not shown, a suitable trap is provided where the pipes 8 leave their respective tanks, which will allow the free exit of water, but will prevent any steam from passing therethrough. That is to say, the traps should be so constructed as to take care of all condensation, keeping the pipes free of water, but allowing the same to be filled at all times with exhaust steam, for the purpose of properly heating the solution.

By heating the pickling bath with exhaust steam, the same is heated very slowly and then only in the vicinity of the coils. The whole bath may become heated but as soon as a fresh batch of wire, rods, etc., is immersed in the solution it becomes colder again and takes some time for the bath to come up to its initial temperature, so in order to hasten the heating of the bath I provide for agitating or circulating the liquor of the bath, so that fresh liquor is constantly being brought into contact with the heating coils 8. I accomplish this by introducing air into the solution under a slight pressure. Agitating the liquor also helps to remove particles of scale which the solution has loosened on the rods, thus helping the cleaning process.

Air is introduced into the pickling vats or tanks 3 through feed pipes 9 having control valves 10, and said pipes 9 communicate or connect with a main supply pipe 11 which is supplied with air by a pump 12, or some other suitable means, so constructed that the pressure of the air fed to the feeders 9, may be regulated.

The tank 6 is preferably made large enough to contain the solution discharged from two or more tanks 3, thus making it possible to have a continuous process, as before stated. The temperature of the solution in the tank 6 is maintained approximately the same as it is in the pickling tanks or vats 3, so as to prevent the iron sulfate or separating itself from the solution, but the solution in tank 6 is not agitated, thus allowing the impurities to settle out. I accomplish this in the same manner in which I heat the solution in tanks 3, that is, by means of a pipe 13, leading from a suitable supply of exhaust steam and coiled within the tank 6. Said pipe 13 enters the tank 6 at or near the top and leaves the same at or near the bottom thereof.

I preferably use piping made of material which will resist the corrosive action of the pickling solution and thereby make it possible to use exhaust steam for heating the solution, without waste of the acid and with a considerable saving of "iron sulfate."

The saturated solution is discharged from the settling tank 6, through a main feed pipe 14 into feeders 15 leading to crystallizing tanks 16. The pipe 14 has a valve 17 and the feeders 15 are each provided with a valve 18.

It is desirable to control the cooling of the solution in the tanks 16, as by the length of time it takes to cool the solution one is able to govern the resulting product and obtain a granular product or a crystal, as the needs may demand. This is accomplished by the use of air introduced into the tanks 16, in somewhat the same manner as it is introduced into the tanks 3; that is through the pipes 19, having valves 20, said pipes 19 communicating or connecting with a main feed pipe 21 supplied by the pump 12. With the type and size of tanks shown it is preferable that the air fed to the tanks 16 shall be fed under a higher pressure than is used in the pickling tanks or vats 3, because in this instance the object is to introduce a new surface of the liquid to the air in order to cool the same, and the pump 12, or whatever device is used to pump the air must be such that the pressure of the air fed to the tanks 16 may be controlled. The faster the solution in the tanks 16 is cooled the smaller and finer will be the product. By changing the size and character of the tanks 16 the pressure of the air need not be so high.

During the cooling of the saturated solution, the sulfate crystals will collect in the crystallizing tanks 16 and after the liquor has been reduced in temperature to a certain degree the liquor will contain a certain proportion of free acid and iron sulfate, and as each has a commercial value, it is desirable to recover all of such chemicals, remaining in the liquor. This may be accomplished by pumping the remaining liquor in the crystallizers into the storage tank 22, where it may be brought up to a temperature of approximately 180° Fahr., or the same pumped directly from the crystallizing tanks 16 into the pickling tanks 3. To pump the liquor from the tanks 16 into the tank 22, a suitable pump 23 is provided, from which leads a pipe 24, and said pipe 24 is connected to the tanks 16 at or near their bottoms by valve controlled pipes 25; said pump 23 is also connected to the tank 22 by a pipe 26. I heat the tank 22 to the required temperature, by a pipe 27 which leads from a suitable supply of exhaust steam, and said pipe is suitably coiled within the tank 22. The pipe 27 leads into the tank 22 at or near the top and leaves the same at or near the bottom thereof. From the tank 22 leads a discharge pipe 28, and said pipe has connected with it pipes 29 leading to the respective tanks 3, and such pipes 29 are controlled by valves 30.

The structure described, comprises preferably, the apparatus by means of which the method is practised, although I may or may not use the tank 22, in which event the pipe 24 will be used to discharge from the tank 16 into the several pickling tanks 3, by the use of the pipes 26 and 26ª. The pipe 26ª is connected with the pipe 26 by a suitable valve 31.

From the foregoing it is believed those skilled in the art will understand the practical steps in the operation of the process and the results to be obtained thereby, without further description.

What I claim is:—

1. The method of saturating a pickling bath with iron sulfate, which consists in heating the pickling bath by means of steam introduced into the bath in such a manner as to prevent the same or condensation therefrom commingling with the bath, and keeping the bath constantly agitated, or in circulation, by the introduction of air into the bath.

2. The method of crystallizing iron sulfate, which consists in bringing the solution in the pickling bath to the crystallizing point, by the application of steam introduced into the bath in such a manner as to prevent the same or condensation therefrom commingling with the bath, and keeping the bath constantly agitated, or in circulation, by the introduction of air into the bath; removing the saturated solution from the bath to suitable crystallizing tanks for the collection of the sulfate, and controlling the cooling of the solution in the crystallizing tanks by means of air introduced therein.

3. The method of crystallizing iron sulfate, which consists in bringing the solution in the pickling bath to the crystallizing point, by the application of steam introduced into the bath in such a manner as to prevent the same or condensation therefrom commingling with the bath, and keeping the bath constantly agitated, or in circulation, by the introduction of air into the bath, conducting the saturated solution to a settling tank or tanks where the same is maintained at approximately the same temperature as in the pickling tanks, but without agitation, so that the impurities may be allowed to settle out, and finally removing the saturated solution from the settling tank into suitable crystallizing tanks for the collection of the sulfate.

4. The method of crystallizing iron sulfate, which consists in bringing the solution in the pickling bath to the crystallizing point, by the application of steam introduced into the bath in such a manner as to prevent the same or condensation therefrom commingling with the bath, and keeping the bath constantly agitated, or in circulation, by the introduction of air into the bath; conducting the saturated solution to a settling tank or tanks where the same is maintained at approximately the same temperature as in the pickling tanks, but without agitation, so that the impurities may be allowed to settle out, and finally removing the saturated solution from the settling tank into suitable crystallizing tanks for the collection of the sulfate, and controlling the cooling of the solution in the crystallizing tanks by means of air introduced therein.

WILLIAM H. SOMMER.